(12) United States Patent
Mennerat et al.

(10) Patent No.: US 8,562,467 B2
(45) Date of Patent: Oct. 22, 2013

(54) TENSIONING DEVICE OF A BELT AND CHAIN DRIVE

(75) Inventors: Thomas Mennerat, Herzogenaurach (DE); Johann Singer, Grossenseebach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 979 days.

(21) Appl. No.: 12/529,422

(22) PCT Filed: Feb. 19, 2008

(86) PCT No.: PCT/EP2008/052000
§ 371 (c)(1),
(2), (4) Date: Sep. 1, 2009

(87) PCT Pub. No.: WO2008/119594
PCT Pub. Date: Oct. 9, 2008

(65) Prior Publication Data
US 2010/0105508 A1    Apr. 29, 2010

(30) Foreign Application Priority Data
Mar. 31, 2007   (DE) .......................... 10 2007 015 676

(51) Int. Cl.
*F16H 7/12* (2006.01)
(52) U.S. Cl.
USPC ....................................................... 474/135
(58) Field of Classification Search
USPC .......... 474/100, 109, 111, 112, 133, 135, 138
See application file for complete search history.

(56) References Cited

U.S. PATENT DOCUMENTS

| 4,557,707 A | 12/1985 | Thomey |
| 5,632,697 A * | 5/1997 | Serkh ............................ 474/109 |

(Continued)

FOREIGN PATENT DOCUMENTS

| DE | 9209454.6 | 9/1992 |
| DE | 4220879 | 1/1994 |

(Continued)

*Primary Examiner* — William E Dondero
*Assistant Examiner* — Robert T Reese
(74) *Attorney, Agent, or Firm* — Volpe and Koenig, P.C.

(57) ABSTRACT

A tensioning device for a belt or chain drive with a tensioning lever (2) which is provided with a rotatable tension roller (6) mounted rotatably a drag bearing (3) constructed as a plain bearing on a base housing (4), and radially at a distance from the axis of rotation (5) of the drag bearing (3); with a pretensioned torsion spring (11), which is constructed as a helical spring (12, 12'), disposed coaxially with the drag bearing (3) and connected at the spring ends (13, 14) thereof at the housing side to the base housing (4), and at the lever side to the tensioning lever (2); and with a brakeshoe (16, 16' 29) which is disposed at one spring end (13, 14) and which can be pressed by the spring end against a component which can rotate about the axis of rotation (5) of the drag bearing (3) relative to the spring end (13, 14). In order to achieve good heat dissipation of the friction damping device and uniform stress on the drag bearing (3), the brake shoe (16, 16') is constructed and is disposed at the lever-side spring end (13) of the helical spring (12, 12') such that the brake shoe (16, 16') is clamped peripherally between the spring end (13) and a radially directed stop surface (23, 23') of a catch attached to the tensioning lever (22, 22') and, via a contacting force ($F_{S\_R}$) resulting from the two peripheral tangential forces ($F_{F\_T}$, $F_{F\_T}$) from the helical spring (12, 12') and on the helical spring (12, 12'), can be pressed with an outer cylindrical friction surface (17) largely radially against a cylindrical inner wall (19) of the base housing (4).

8 Claims, 4 Drawing Sheets

(56) References Cited

U.S. PATENT DOCUMENTS

| | | | | |
|---|---|---|---|---|
| 5,647,813 | A * | 7/1997 | Serkh | 474/135 |
| 6,565,468 | B2 * | 5/2003 | Serkh | 474/135 |
| 6,609,988 | B1 * | 8/2003 | Liu et al. | 474/133 |
| 7,004,863 | B2 * | 2/2006 | Serkh et al. | 474/109 |
| 8,118,698 | B2 * | 2/2012 | Guhr | 474/135 |
| 8,267,819 | B2 * | 9/2012 | Lehtovaara et al. | 474/109 |
| 2003/0119616 | A1 * | 6/2003 | Meckstroth et al. | 474/135 |
| 2003/0216204 | A1 | 11/2003 | Serkh et al. | |

FOREIGN PATENT DOCUMENTS

| | | |
|---|---|---|
| DE | 102004047422 | 4/2006 |
| DE | 102006023565 | 11/2007 |
| EP | 0780597 | 6/1997 |
| EP | 0780598 | 6/1997 |
| JP | 2003254399 | 9/2003 |
| WO | 0146603 | 6/2001 |

* cited by examiner

TENSIONING DEVICE OF A BELT AND CHAIN DRIVE

BACKGROUND

The invention relates to a tensioning device of a belt and chain drive with a tensioning lever that is mounted so that it can rotate on a base housing via a drag bearing constructed as a plain bearing and that is provided with a rotating tensioning roller at a radial distance from the rotational axis of the drag bearing, with a pre-tensioned torsion spring that is constructed as a helical spring and that is arranged coaxial to the drag bearing and that is connected on its spring ends on the housing side to the base housing and on the lever side to the tensioning lever, and with a brake shoe that is arranged on one spring end and that can be pressed by this spring end against a component that can rotate about the rotational axis of the drag bearing relative to the spring end.

Tensioning devices of the structure designated above are used in different constructions preferably in auxiliary assembly drives of combustion engines. Such a tensioning device is used to tension a belt and chain, such as a V-type belt or a multi-V belt that is guided over a driving wheel and usually several driven wheels, that is, to compensate for changes in length and tension caused by operation in the belt or chain and thus to prevent slippage of the belt and chain on one of the wheels.

For this purpose, the tensioning device is arranged within the belt or chain drive in the region of a non-tensioned section of the belt or chain such that the tensioning roller mounted on the tensioning lever so that it can rotate via a roller bearing is partially wrapped around by the belt or chain and is pressed against the belt or chain by the effect of a twisting moment of the pretensioned torsion spring acting on the tensioning lever. For a reduction of the tension of the belt or chain associated with lengthening of the affected belt section, the loop of the belt or chain guided around the tensioning roller is increased under the spring extension of the tensioning lever. For an increase in the tension of the belt or chain associated with shortening of the belt section, the loop of the belt or chain guided around the tensioning roller is decreased under spring retraction of the tensioning lever. Both pivoting movements of the tensioning lever are damped by the friction moment of a brake shoe, wherein, in a desired way, the damping is dependent on the direction of the load, that is, proportional to the twisting moment of the torsion spring, and thus the spring retraction of the tensioning lever is more strongly damped than the spring extension.

Such tensioning devices are known both in an embodiment mounted on the inside with a support of a bearing journal connected rigidly to the tensioning lever in the boss forming a component of the base housing and also in an embodiment mounted on the outside with a support of a boss connected rigidly to the tensioning lever on the bearing journal forming a component of the base housing. The bearing of the tensioning lever in or on the base housing is formed by at least one plain bearing bushing that is arranged between the bearing journal and the boss and that is usually made from a durable and simultaneously low-friction plastic material.

The base housing can be provided with outer mounting flanges or with a central borehole for mounting the tensioning device on a motor housing, such as, e.g., the crankcase or the timing case of a reciprocating-piston combustion engine. With respect to the arrangement of the tensioning roller, for such a tensioning device there is also a difference between a so-called offset or Z configuration in which the tensioning roller is arranged axially on the outside of the tensioning lever facing away from the base housing and a so-called in-line or U configuration in which the tensioning roller is arranged in the radial direction at the side of the base housing axially on the inside of the tensioning lever facing the base housing.

Due to tight installation relationships, general cost pressures for production, as well as high performance requirements, the tensioning device must satisfy many requirements. Thus, the tensioning device should have small dimensions, that is, should take up less structural space. For achieving low production costs, the tensioning device should be made from the fewest number of components possible that have a geometrically simple construction and thus can be produced and also assembled easily and economically. In addition, the tensioning device should feature high friction damping that can be adjusted to the corresponding application and good heat dissipation of the friction heat in this respect. Finally, by achieving uniform and therefore essentially tilting moment-free loading of the drag bearing, lower wear of the plain bearing bushing and a precise maintenance of the angle of the tensioning lever and also the tensioning roller relative to the base housing or the belt and chain should be given. In order to satisfy these requirements, different tensioning devices of the constructions noted above have already been proposed.

From EP 0 780 597 B1, a tensioning device according to the class is known in which a brake shoe provided with a relatively small, outer cylindrical friction surface is arranged on the housing-side spring end of a helical spring that can be loaded in the closing sense. The spring end has an inward angled spring leg and comprises, in the region of the corner of the angle, a housing-fixed journal by which the twisting moment of the helical spring is introduced into the base housing. The spring leg contacts the inside of the brake shoe and presses this brake shoe with its outer cylindrical friction surface in the radial direction against a cylindrical inner wall of the tensioning lever and also, on the peripheral side, against a stop surface of a housing-fixed stop that contacts the brake shoe in a first embodiment or against a housing-fixed journal, wherein, in a second variant, the brake shoe is mounted so that it can rotate about this journal.

The radial contact force of the brake shoe on the tensioning lever is provided for the purpose of, in addition to the generation of a friction moment, damping the pivoting movement of the tensioning lever in connection with the axial distance of the brake shoe to a middle radial bearing plane of the plain bearing bushing of the drag bearing, also for the compensation of a tilting moment caused by the resulting belt and chain force in connection with the axial distance of the tensioning roller. Due to the lever relationships at the spring end and the division of the spring force transmitted by the spring leg to the brake shoe, the friction moment generated in this way, however, is relatively small. In addition, the construction of the affected damping device is relatively complicated and can only be produced and assembled accordingly high expense. In addition, the introduction of the heat generated by the friction work of the brake shoe is disadvantageously limited locally and in the tensioning lever. The tensioning lever, however, is already thermally loaded by the rolling bearing of the tensioning roller and the heat of the tensioning lever is dissipated from there to the surrounding air with relatively poor heat transfer.

For avoiding at least some of the disadvantages named above, in the unpublished DE 10 2006 023 565.7 of the applicant, alternative embodiments of a tensioning device according to the class have been proposed. In a first preferred embodiment of the tensioning device according to FIG. 5 in this document, a brake shoe provided essentially as a circular ring segment with a relatively large outer cylindrical friction surface is arranged on the housing-side spring end of a helical spring that can be loaded in the closing sense between the outer winding of the spring end and a cylindrical inner wall of the tensioning lever. The spring end has a spring leg that is bent outward and that contacts the free end of the brake shoe on the peripheral side. The opposite end of the brake shoe on the peripheral side contacts a stop surface of a housing-fixed catch. The twisting moment of the helical spring is thus introduced as a tangential force via the spring leg, the brake shoe, and the catch into the base housing, wherein a relatively large radial contact force is produced from the vector addition of the two tangential forces acting on the brake shoe, wherein, with this contact force, the brake shoe is pressed with its friction surface against the cylindrical inner wall of the tensioning lever.

In a second embodiment of the tensioning device according to FIG. 6 in DE 10 2006 023 565.7, a brake shoe similarly provided as a circular ring segment with a relatively large outer cylindrical friction surface is arranged on the housing-side spring end of a leg-less helical spring that can be loaded in the opening sense facing away from the outer winding of the spring end on a cylindrical inner wall of the tensioning lever. The stub spring end of the helical spring contacts, on the peripheral side, the free end of the brake shoe. The opposite end of the brake shoe on the peripheral side contacts a stop surface of a housing-fixed catch. In this case, the twisting moment of the helical spring is introduced as a tangential force via the stub spring end, the brake shoe, and the catch into the base housing, wherein a relatively large radial contact force is also produced from the vector addition of the two tangential forces acting on the brake shoe, wherein, with this contact force, the brake shoe is pressed with its friction surface against the cylindrical inner wall of the tensioning lever.

The damping devices of the two configurations of the known tensioning device noted above have a construction that can be produced more easily and more economically relative to the previously known tensioning device described above, a larger surface-area introduction of the friction heat of the brake shoe, and a significantly increased friction damping of a pivoting movement of the tensioning lever due to a significantly increased contact force. However, the disadvantage of the introduction of the friction heat of the damping device into the tensioning lever remains.

SUMMARY

The invention is therefore based on the objective of providing a tensioning device of the construction named above that features, for a simple and space-saving construction, improved dissipation of the friction heat of the damping device and also expansion of the adjustability of the friction damping of the tensioning lever, and the balancing of the drag bearing.

The invention is based on the knowledge that an arrangement of a brake shoe on the lever-side end of the helical spring is more advantageous both due to a therefore possible introduction of the friction heat of the damping device into the base housing and also due to more favorable lever relationships for compensation of the tilting moment caused by the chain or belt force acting on the tensioning roller with respect to the drag bearing.

The stated objective is met according to the features of the main claim by a tensioning device of a chain and belt drive, with a tensioning lever that is mounted so that it can rotate on a base housing via a drag bearing constructed as a plain bearing and that is provided with a rotating tensioning roller at a radial distance from the rotational axis of the drag bearing, with a pretensioned torsion spring that is constructed as a helical spring and that is arranged coaxial to the drag bearing and that is connected on its spring ends on the housing side to the base housing and on the lever side to the tensioning lever, and with a brake shoe that is arranged on one spring end and that can be pressed by this spring end against a component that can rotate about the rotational axis of the drag bearing relative to the spring end. In addition, it is provided that the brake shoe is constructed and arranged on the lever-side spring end of the helical spring such that this brake shoe is clamped on the peripheral side between the spring end and a radially directed stop surface of a lever-fixed catch and can be pressed with an outer cylindrical friction surface in the radial direction against a cylindrical inner wall of the base housing by a contact force $F_{S\_R}$ resulting from the two peripheral-side tangential forces $F_{F\_T}$, $F_{F\_T}'$ from the helical spring and on the helical spring.

Advantageous constructions and improvements of the tensioning device according to the invention are described below.

Through the arrangement of the brake shoe between the lever-side spring end of the helical spring, that is, the end connected to the tensioning lever, and the lever-fixed catch, that is, connected rigidly to the tensioning lever, the brake shoe is pressed with its outer cylindrical friction surface in the radial direction against the cylindrical inner wall of the base housing by the vector sum of the two tangential forces ($F_{F\_T}$, $F_{F\_T}'$) contacting on the peripheral side. Thus, the friction heat generated by the damping device for a pivoting movement of the tensioning lever is dissipated directly into the corresponding component of the base housing, wherein optimal cooling is guaranteed by the heat conduction within the base housing and furthermore into an adjacent machine housing, e.g., a timing case of a combustion engine.

The friction surface of the brake shoe can have a relatively large construction, so that the friction work of the damping device is distributed onto a larger surface, wherein the mechanical wear and the thermal load of the brake shoe is kept essentially low. A desired damping rate can be set, in addition to varying the material of the brake shoe, in a simple way by selecting the peripheral-side length, that is, the arc width of the brake shoe through which the radial contact force $F_{S\_R}$ of the brake shoe formed by the vector sum of the two tangential forces $F_{F\_T}$, $F_{F\_T}'$ contacting on the peripheral side is determined.

The compensation of the tilting moment $M_K = F_{Z\_R} * L_1$ exerted by the radial belt or chain force $F_{Z\_R}$ acting on the tensioning roller on the plain bearing bushing of the drag bearing can be realized for a corresponding peripheral-side orientation of the lever-fixed catch by the tangential force $F_{F\_T}$ of the brake shoe acting on the affected stop surface, wherein, through the relatively small axial distance $L_2$ to the plain bearing bushing, favorable lever relationships are provided especially for a small axial distance $L_1$ of the tensioning roller.

In a first preferred embodiment, the helical spring can be loaded in the closing sense and has, on its lever-side spring end, a spring leg bent outward. In this case, the brake shoe is constructed as a circular ring segment and is arranged between the outer winding of the spring end and also the cylindrical inner wall of the base housing such that the peripheral-side end of the brake shoe close to the leg contacts the spring leg of the helical spring, the peripheral-side end of the brake shoe away from the leg contacts the stop surface of the lever-fixed catch, and the outer cylindrical friction surface of the brake shoe contacts the cylindrical inner wall of the base housing. Thus, the brake shoe could have geometrically simple contours and is held with a frictional fit and a form fit in its provided position, and also loaded only in compression, so that economical production is possible.

In a second preferred embodiment, the helical spring can be loaded in the opening sense and has, on its lever-side spring end, a stub end. In this case, the brake shoe is constructed as a circular ring segment and is arranged facing away from the outer winding of the spring end on the peripheral side so that the peripheral-side end of the brake shoe close to the spring end contacts the stub end of the helical spring, the peripheral-side end of the brake shoe away from the spring end contacts the stop surface of the lever-fixed catch, and the outer cylindrical friction surface of the brake shoe contacts the cylindrical inner wall of the base housing. In this case, the brake shoe can have geometrically simple contours and is similarly held with a friction fit and a form fit in its provided position, and also similarly loaded only in compression.

In order to be able to use the tangential force $F_{F\_T}$ acting on the stop surface of the catch optimally for the compensation of the tilting moment $M_K=F_{Z\_R}*L_1$ generated by the belt or chain force $F_{Z\_R}$ acting on the tensioning roller, the lever-fixed catch is arranged on the peripheral side with respect to the rotational axis of the drag bearing such that the associated stop surface is oriented perpendicular to a middle acting direction of the belt and chain force $F_{Z\_R}$ on the tensioning roller of the tensioning lever.

However, if the friction moment generated by the lever-side brake shoe is not high enough for sufficient damping of the pivoting movement of the tensioning lever or if the tangential force $F_{F\_T}$ acting on the catch is not sufficient for the compensation of the tilting moment $M_K=F_{Z\_R}*L_1$ caused by the belt or chain force $F_{Z\_R}$ on the plain bearing bushing, then an additional, second brake shoe could be provided that is constructed and arranged on the housing-side spring end of the helical spring such that this brake shoe is clamped on the peripheral side between the spring end and a radially directed stop surface of a housing-fixed catch and can be pressed with an outer cylindrical friction surface essentially radially against a cylindrical, inner wall of the tensioning lever by a contact force $F_{S\_R}$ resulting from the two peripheral-side tangential forces $F_{F\_T}, F_{F\_T}'$. For the advantage of expanded adjustability of the friction damping and tilting moment compensation of the plain bearing bushing also called balancing, it is taken into account that a part of the friction heat of the damping device, namely the portion generated by the lever-side brake shoe, is introduced into the affected component of the tensioning lever.

In the case of the use of a helical spring that can be loaded in the closing sense, this also has, on its housing-side spring end, a spring leg bent outward. The affected brake shoe is then advantageously similarly constructed as a circular ring segment and arranged between the outer winding of the spring end and the cylindrical inner wall of the tensioning lever such that the peripheral-side end of the brake shoe close to the leg contacts the spring leg of the helical spring, the peripheral-side end of the brake shoe away from the leg contacts the stop surface of the housing-fixed catch, and the outer, cylindrical friction surface of the brake shoe contacts the cylindrical inner wall of the tensioning lever.

In the case of the use of a helical spring that can be loaded in the opening sense, this spring also has a stub end on its housing-side spring end accordingly. In this case, the brake shoe is advantageously also formed as a circular ring segment and arranged facing away from the outer winding of the spring end on the peripheral side such that the peripheral-side end of the brake shoe close to the spring end contacts the stub end of the helical spring, the peripheral-side end of the brake shoe away from the spring end contacts the stop surface of the housing-fixed catch, and the outer, cylindrical friction surface of the brake shoe contacts the cylindrical inner wall of the tensioning lever.

For the use of an additional, housing-side brake shoe, the radial contact force $F_{S\_R}$ of this second brake shoe acts on the tensioning lever with a relatively large axial distance $L_3$, wherein this contact force is produced from the vector sum of the two peripheral-side tangential forces $F_{F\_T}, F_{F\_T}'$ acting on the brake shoe. Now, in order to be able to use this contact force optimally for the compensation of the tilting moment $M_K=F_{Z\_R}*L_1$ generated by the belt or chain force $F_{Z\_R}$ acting on the tensioning roller and optionally the tilting moment $M_K=F_{F\_T}*L_2$ generated by the tangential force $F_{F\_T}$ acting on the lever-fixed catch, the peripheral-side length of the brake shoe and the peripheral-side position of the housing-fixed catch with the associated stop surface are preferably constructed and arranged so that a radial middle axis of the brake shoe is oriented parallel to the middle acting direction of the belt and chain force $F_{Z\_R}$ on the tensioning roller of the tensioning lever, wherein the radial contact force $F_{S\_R}$ acts parallel to the belt or chain force $F_{Z\_R}$.

For the use of a lever-side and a housing-side brake shoe, the two spring ends of the helical spring, the stop surfaces of the two catches, the cylindrical inner walls of the base housing and the tensioning lever, and also the two brake shoes could preferably have structurally identical constructions for reducing the costs of machining and parts.

For the tensioning device according to the invention, the radial contact force $F_{S\_R}$ acting on the brake shoe and thus the damping rate for given peripheral forces $F_{F\_T}, F_{F\_T}'$ are set essentially by the peripheral-side length of the brake shoe. Thus, an arc width of the brake shoe of 60° sets a relationship of the radial contact force $F_{S\_R}$ to the peripheral-side spring forces $F_{F\_T}, F_{F\_T}'$ contacting on two sides of $F_{S\_R}/F_{F\_T}=1$. In contrast, an arc width of the brake shoe of 180° produces a value of $F_{S\_R}/F_{F\_T}=2$. The peripheral-side length, that is the arc width of the brake shoe, preferably lies in this range from 60° to 180°.

BRIEF DESCRIPTION OF THE DRAWINGS

The invention will be explained in greater detail below using some embodiments with reference to the accompanying drawing. Shown therein are.

DETAILED DESCRIPTION OF THE PREFERRED EMBODIMENTS

Figure 1:
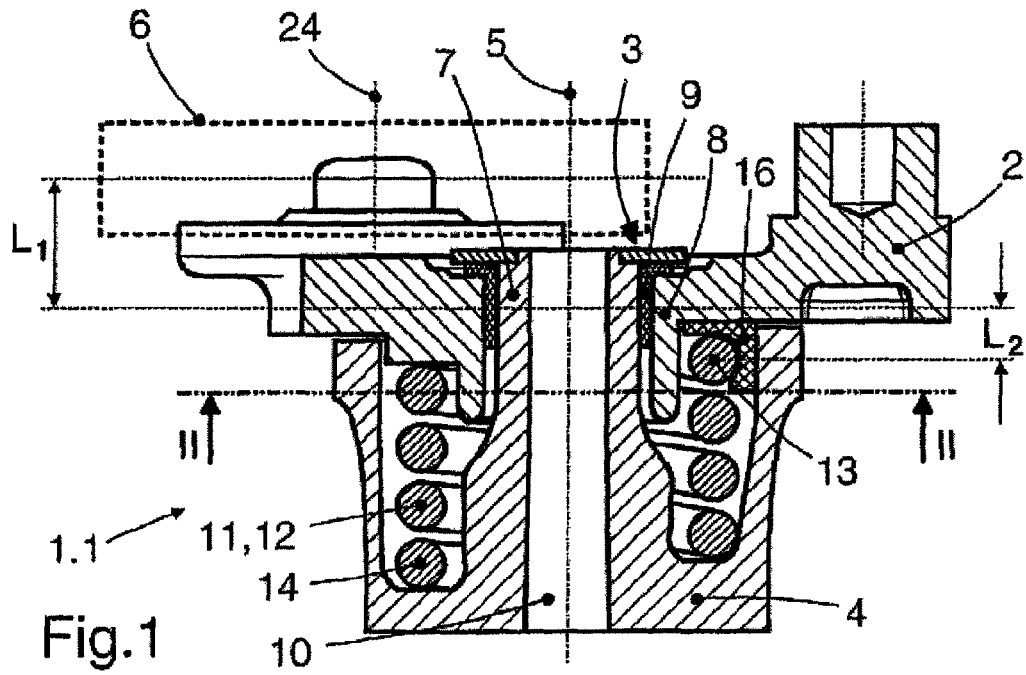
FIG. 1 is a longitudinal section of a first preferred embodiment of the tensioning device according to the invention.
Figure 2:
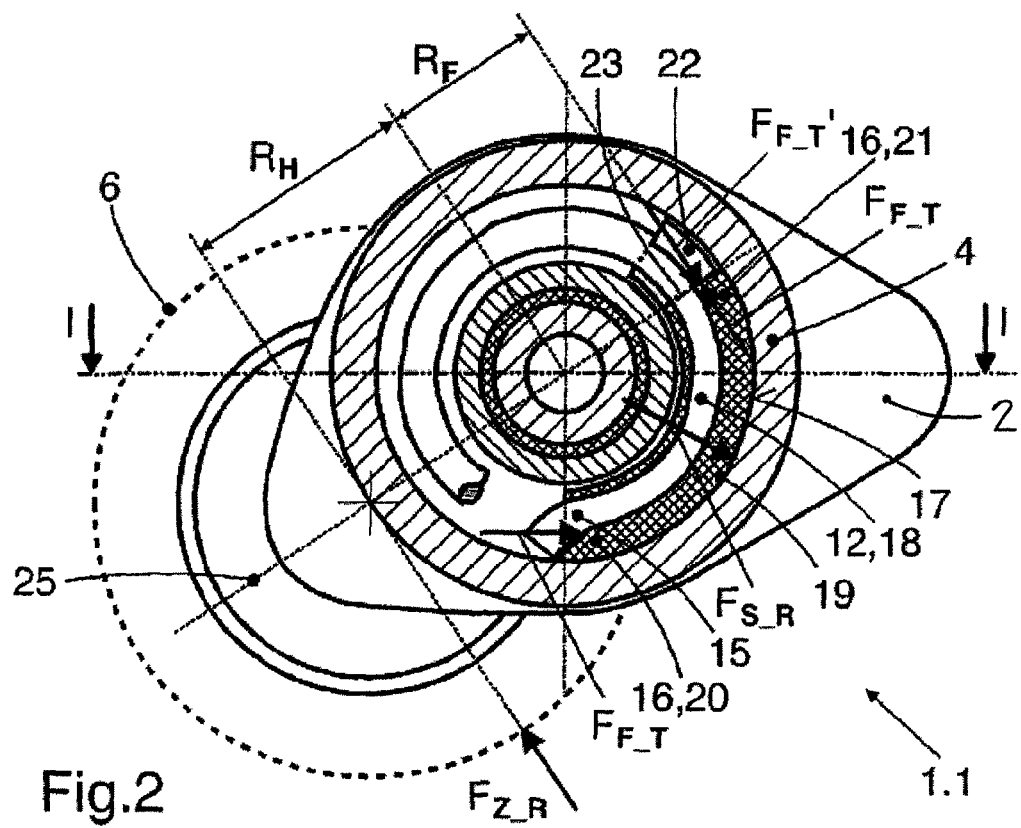
FIG. 2 is a radial section of the tensioning device according to FIG. 1.

A first preferred embodiment of the tensioning device 1.1 according to the invention for a belt or chain drive is illustrated in FIG. 1 in a radial view of a longitudinal section and in FIG. 2 in an axial view of the radial section II-II according to FIG. 1. In a so-called offset or Z arrangement, a tensioning lever 2 is mounted so that it can pivot on a base housing 4 by a drag bearing 3 and is provided with a rotating tensioning roller 6 at a radial distance from the rotational axis 5 of the drag bearing 3. Only the outer periphery of this tensioning roller is sketched with dashed lines. The drag bearing 3 is formed from a bearing journal 7 connected in one piece to the base housing 4, a boss 8 forming a component of the tensioning lever 2, and a plain bearing bushing 9 arranged between the bearing journal 7 and the boss 8. The base housing 4 is provided with a central borehole 10 arranged coaxial in the bearing journal 7 for mounting on another housing, e.g., a crankcase or a timing case of a reciprocating-piston combustion engine. Through this central borehole 10 and through the opening of a tensioning wheel securing the tensioning lever 2 in the axial direction, a not-shown mounting screw can be guided that is screwed tightly onto the other housing.

A torsion spring 11 constructed as a helical spring 12 is arranged coaxial to the rotational axis 5 of the drag bearing 3 and is connected with its two spring ends 13, 14 with a positive fit in the axial direction on the housing side to the base housing 4 and on the lever side to the tensioning lever 2.

The screw spring 12 can be loaded in the closing sense and has, on its lever-side spring end 13, a spring leg 15 bent outward (see FIG. 2). A brake shoe 16 constructed essentially as a circular ring segment and provided with an outer cylindrical friction surface 17 is arranged between the outer winding 18 of the spring end 13 and a cylindrical inner wall 19 of the base housing 4, so that the peripheral-side end 20 of the brake shoe 16 close to the leg contacts the spring leg 15 of the helical spring 12, the peripheral-side end 21 of the brake shoe 16 away from the leg contacts a stop surface 23 of a lever-fixed catch 22, and the outer cylindrical friction surface 17 of the brake shoe 16 contacts the cylindrical inner wall 19 of the base housing 4.

An equal-magnitude twisting moment $M_T=F_{F\_T}*R_F$ of the helical spring 12 introduced via the spring leg 15, the brake shoe 16, and the catch 22 into the tensioning lever 2 acts against the twisting moment $M_T=F_{Z\_R}*R_H$ introduced into the tensioning lever 2 via a radial belt and chain force $F_{Z\_R}$ acting on the tensioning roller 6, wherein, RH designates the radial distance of the rotational axis 24 of the tensioning roller 6 to the rotational axis 5 of the drag bearing 3, $F_{F\_T}$ designates the tangential spring force of the helical spring 12, and $R_F$ designates the active spring radius of the helical spring 12.

Thus, the tangential spring force $F_{F\_T}$ acts from the spring leg 15 onto the end 20 of the brake shoe 16 close to the leg, while the equal-magnitude, opposite-direction, tangential reaction force $F_{F\_T}'$ acts from the catch 22 onto the end 21 of the brake shoe 16 away from the leg. The vector addition of the two mentioned tangential forces $F_{F\_T}$, $F_{F\_T}'$ produces a radial contact force $F_{S\_R}$ with which the brake shoe 16 presses with its outer cylindrical friction surface 17 against the cylindrical inner wall 19 of the base housing 4, wherein a friction moment blocking the pivoting movement is generated when the tensioning lever 2 pivots about the pivot axis 5. This friction moment is proportional to the tangential spring force $F_{F\_T}$ and the twisting moment $M_T$ of the helical spring 12. The friction heat generated by the friction work in the contact surface between the friction surface 17 of the brake shoe 16 and the cylindrical inner wall 19 of the base housing 4 is essentially dissipated into the base housing 4 and forwarded from there.

For the compensation of an active tilting moment $M_K=F_{Z\_R}*L_1$ due to the belt or chain force $F_{Z\_R}$ about an imaginary tilting axis 25 located in a middle radial bearing plane of the plain bearing bushing 9, wherein $L_1$ designates the axial distance of the force contact plane of the belt and chain force $F_{Z\_R}$ to the tilting axis 25, the lever-fixed catch 22 is arranged on the peripheral side with respect to the rotational axis 5 of the drag bearing 3 such that the associated contact surface 23 is perpendicular to the active direction of the belt and chain force $F_{Z\_R}$ and the tangential force $F_{F\_T}$ of the brake shoe 16 acting on the stop surface 23 is directed in the same direction to the belt and chain force $F_{Z\_R}$.

In the ideal case, the tilting moment $M_K=F_{F\_T}*L_2$ caused by the tangential force $F_{F\_T}$ about the tilting axis 25 just compensates the tilting moment $F_{Z\_R}*L_1$ of the belt and chain force $F_{Z\_R}$, wherein $L_2$ designates the axial distance of the force contact plane of the tangential force $F_{F\_T}$ to the tilting axis 25. Thus, the plain bearing bushing 9 according to the equation $\Sigma M_K=F_{Z\_R}*L_1-F_{F\_T}*L_2=0$ is essentially free from any tilting moment and is therefore loaded uniformly, which provides for low wear of the plain bearing bushing 9 over the service life and for maintenance of the angle of the tensioning lever 2 and the tensioning roller 6 relative to the base housing 4 and the belt and chain.

Figure 3:
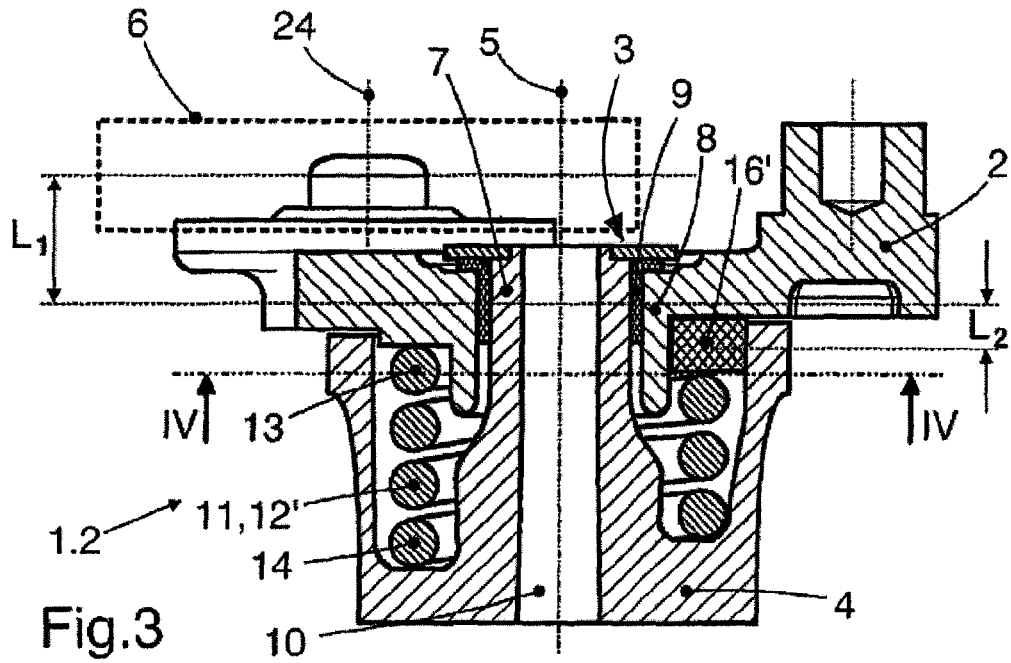
FIG. 3 is a longitudinal section of a second preferred embodiment of the tensioning device according to the invention.
Figure 4:
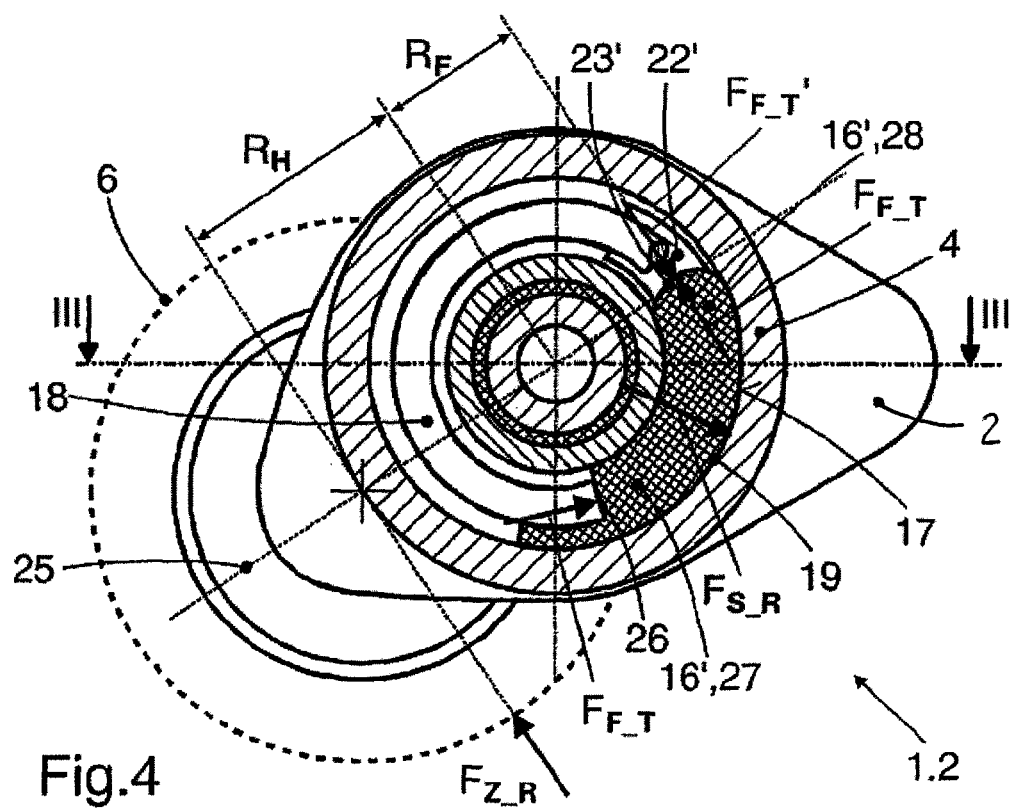
FIG. 4 is a radial section of the tensioning device according to FIG. 3.

A second preferred embodiment of a tensioning device 1.2 according to the invention in a belt or chain drive is illustrated in FIG. 3 in a radial view of a longitudinal section and in FIG. 4 in an axial view of the radial section IV=IV according to FIG. 3. The construction of the tensioning device 1.2 corresponds to the configuration of the torsion spring 11, the brake shoe 16', and the catch 22' of the first variant according to FIG. 1 and FIG. 2.

Now the torsion spring 11 is constructed as a helical spring 12' that can be loaded in the opening sense and that has a stub end 26 on its lever-side spring end 13. The brake shoe 16' similarly constructed as a circular ring segment is also arranged on the peripheral side facing away from the outer winding 18 of the spring end 13 such that the flat end 27 of the brake shoe 16' close to the spring end on the peripheral side contacts the stub end 26 of the helical spring 12', the convex, rounded end 28 of the brake shoe 16' away from the spring end on the peripheral side contacts the concave, rounded stop surface 23' of the lever-fixed catch 22', and the outer cylindrical friction surface 17 of the brake shoe 16' contacts the cylindrical inner wall 19 of the base housing 4.

The functioning of the tensioning device 1.2 corresponds to that of the first embodiment according to FIG. 1 and FIG. 2, wherein, in this case, the lever-fixed catch 22' is also arranged with respect to the rotational axis 5 of the drag bearing 3 on the peripheral side such that the associated stop surface 23' is directed approximately perpendicular to the acting direction of the belt and chain force $F_{Z\_R}$ and the tangential force $F_{F\_T}$ of the brake shoe 16' acting on the stop surface 23' is directed in the same direction to the belt and chain force $F_{Z\_R}$. In this way, the tilting moment $M_K=F_{F\_T}*L_2$ caused by the tangential force $F_{F\_T}$ about the tilting axis 25 essentially compensates the tilting moment of the belt and chain force $M_K=F_{Z\_R}*L_1$, so that the equation $\Sigma M_K=F_{Z\_R}*L_1-F_{F\_T}*L_2=0$ also applies here.

Figure 5:
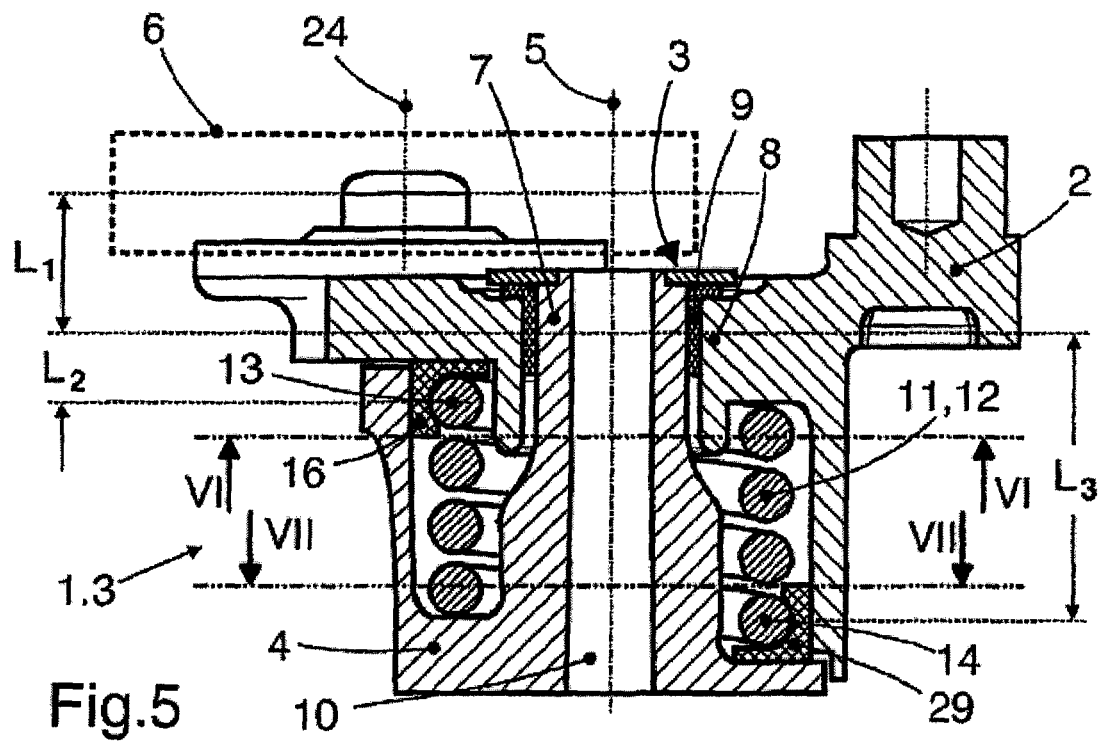
FIG. 5 is a longitudinal section of a third preferred embodiment of the tensioning device according to the invention.
Figure 6:
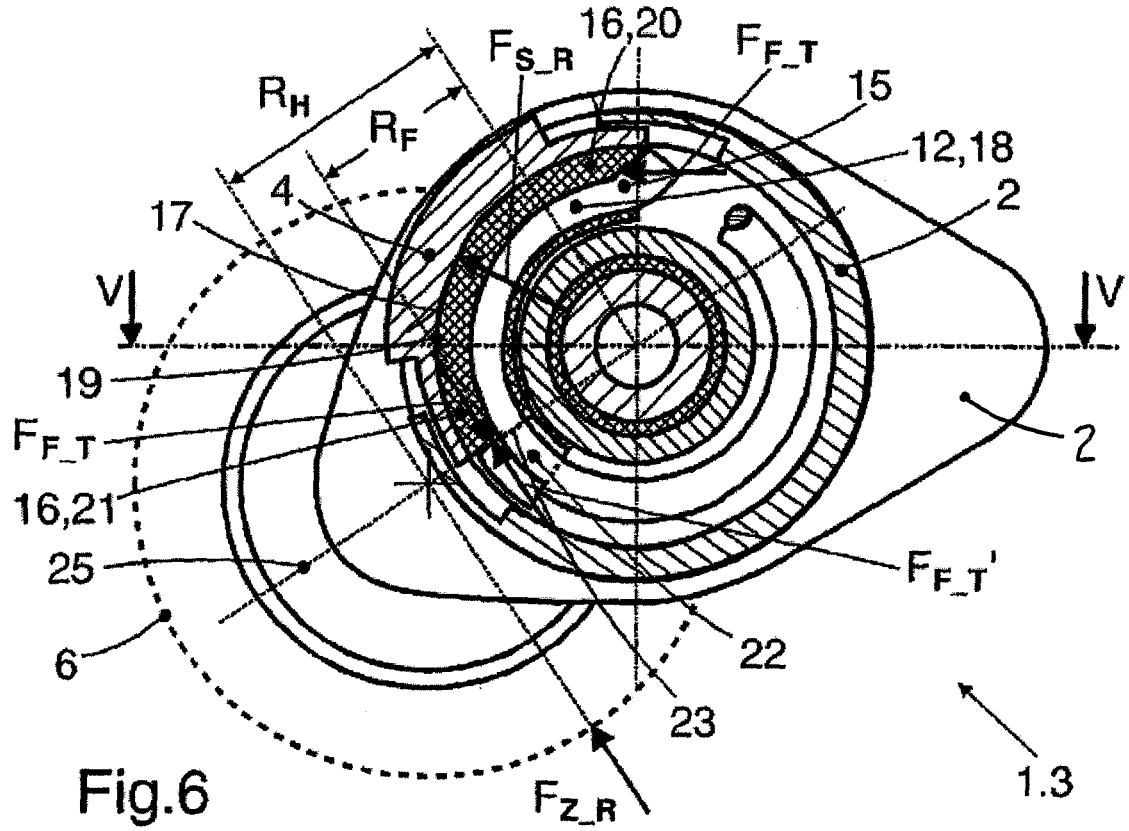
FIG. 6 is a first radial section of the tensioning device according to FIG. 5.
Figure 7:
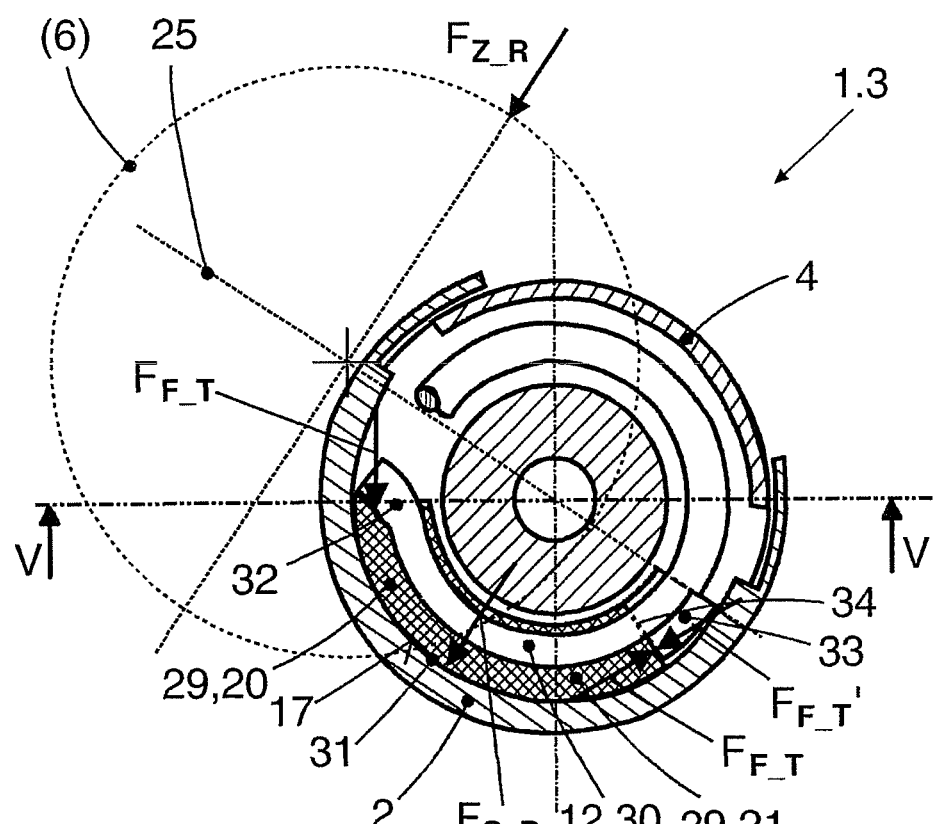
FIG. 7 is a second radial section of the third construction of the tensioning device according to the invention from FIG. 5.

A third preferred embodiment of the tensioning device 1.3 of a belt or chain drive according to the invention is illustrated in FIG. 5 in a radial view of a longitudinal section, in FIG. 6 in an axial view of the radial section VI-VI according to FIG. 5, and in FIG. 7 in an axial view of the radial section VII-VII according to FIG. 3. The construction of the tensioning device 1.3 essentially corresponds to that of the first variant according to FIG. 1 and FIG. 2.

In contrast to the first embodiment, however, now a second brake shoe 29 is provided that is arranged on the housing-side spring end 14 of the helical spring 12. In a structurally identical construction to the arrangement on the lever-side spring end 13, the brake shoe 29 constructed essentially as a circular ring segment and provided with an outer cylindrical friction surface 17 is arranged between the outer winding 30 of the spring end 14 and a cylindrical inner wall 31 of the tensioning lever 2 such that the end 20 of the brake shoe 29 close to the leg on the peripheral side contacts a spring leg 32 that is bent outward, the end 21 of the brake shoe 29 away from the leg on the peripheral side contacts a contact surface 34 of a housing-fixed catch 33, and the outer cylindrical friction surface 17 of the brake shoe 29 contact the cylindrical inner wall 31 of the tensioning lever 2.

Another difference to the first embodiment according to FIG. 1 and FIG. 2 is provided in that the lever-fixed catch 22 is now arranged on the peripheral side with respect to the rotational axis 5 of the drag bearing 3 such that the associated stop surface 23 is oriented perpendicular to the acting direction of the belt and chain force $F_{Z\_R}$ and the tangential force $F_{F\_T}$ of the brake shoe 16 acting on the stop surface 23 is directed opposite the belt and chain force $F_{Z\_R}$. In this way, the tilting moment $M_K = F_{F\_T} * L_2$ caused by the tangential force $F_{F\_T}$ about the tilting axis 25 is amplified by the tilting moment of the belt and chain force $M_K = F_{Z\_R} * L_1$. For compensating these two tilting moments $(F_{Z\_R} * L_1)$ and $(F_{F\_T} * L_2)$, however, the housing-fixed catch 33 is arranged on the peripheral side with respect to the rotational axis 5 of the drag bearing 3 and the peripheral-side length, that is, the arc width of the second brake shoe 29, are dimensioned such that the radial contact force $F_{S\_R}$ acting on the brake shoe 29 is parallel and directed in the same direction to the belt and chain force $F_{Z\_R}$.

In this way, a tilting moment $M_K = F_{S\_R} * L_3$ is exerted on the tensioning lever 2 by the contact force $F_{S\_R}$ over the axial distance $L_3$ to the tilting axis 25, wherein this tilting moment is directed opposite the other two tilting moments $(F_{Z\_R} * L_1 + F_{F\_T} * L_2)$ and these are compensated as completely as possible corresponding to the equation $$\Sigma M_K = F_{Z\_R} * L_1 + F_{F\_T} * L_2 - F_{S\_R} * L_3 = 0.$$

Here, in this embodiment of the tensioning device 1.3 in connection with an increase of the friction damping, a uniform loading of the plain bearing bushing 9 is achieved. For illustrative reasons, the second brake shoe 29 in FIG. 5 is drawn shifted on the peripheral side, while the brake shoe 29 in FIG. 7 is illustrated in the correct position.

List of Reference Symbols
1.1 Tensioning device
1.2 Tensioning device
1.3 Tensioning device
2 Tensioning lever
3 Drag bearing
4 Base housing
5 Rotational axis (of 2, 3)
6 Tensioning roller
7 Bearing journal
8 Boss
9 Plain bearing bushing
10 Central borehole
11 Torsion spring
12 Helical spring
12' Helical spring
13 Lever-side spring end
14 Housing-side spring end
15 Spring leg
16 Brake shoe
16' Brake shoe
17 Friction surface
18 Outer winding
19 Inner wall
20 End close to leg
21 End away from leg
22 Catch
22' Catch
12 Stop surface
23' Stop surface
24 Rotational axis of 6
25 Tilting axis
26 Stub end
27 End close to spring end
28 End away from spring end
29 Second brake shoe
30 Outer winding
31 Inner wall
32 Spring leg
33 Catch
34 Stop surface
$R_F$ Effective radius of 12, 12'
$R_H$ Radial distance
$F_{F\_T}$ Tangential spring force from 12, 12'
$F_{F\_T}'$ Tangential reaction force on 12, 12'
$F_{S\_R}$ Radial contact force from 16, 16', 29
$F_{Z\_R}$ Radial belt and chain force
$L_1$ Axial distance
$L_2$ Axial distance
$L_3$ Axial distance
$M_K$ Tilting moment about 25
$M_T$ Twisting moment about 5

The invention claimed is:

1. Tensioning device for a belt or chain drive, comprising a tensioning lever that is mounted on a base housing so that it can rotate via a drag bearing constructed as a plain bearing, a rotating tensioning roller located at a radial distance from a rotational axis of the drag bearing, a pretensioned helical torsion spring that is arranged coaxial to the drag bearing and connected on a housing side spring end to the base housing and on a lever side spring end to the tensioning lever, wherein the spring is loadable in an opening sense and the lever side spring end is a stub end, and a brake shoe is arranged on the lever side spring end such that the brake shoe is clamped on a peripheral side between the lever side spring end and a radially oriented stop surface of a lever-fixed catch as the spring is loaded in the opening sense, wherein the brake shoe is constructed as a circular ring segment facing away from an outer winding of the lever side spring end on a peripheral side such that an end of the brake shoe close to the lever side spring end on the peripheral side contacts the stub end and an end of the brake shoe away from the lever side spring end on the peripheral side contacts the stop surface of the lever-fixed catch so that the brake shoe is pressable with an outer, cylindrical friction surface essentially in a radial direction against a cylindrical inner wall of the base housing by a contact force resulting from two peripheral-side tangential forces from the helical spring and on the helical spring.

2. Tensioning device according to claim 1, wherein the lever-fixed catch is arranged on the peripheral side with respect to the rotational axis of the drag bearing such that the associated stop surface is oriented perpendicular to a middle acting direction of a belt or chain force on the tensioning roller of the tensioning lever.

3. Tensioning device according to claim 1, wherein an additional brake shoe is constructed and arranged on a housing side spring end of the helical spring such that the additional brake shoe is clamped on a peripheral side between the housing side spring end and a radially directed stop surface of a housing-fixed catch and can be pressed with an outer cylindrical friction surface essentially in a radial direction against a cylindrical inner wall of the tensioning lever by the contact force resulting from the two peripheral-side tangential forces.

4. Tensioning device according to claim 3, wherein the helical spring has, on the housing side spring end, a spring leg bent outward and the additional brake shoe is constructed as a circular ring segment and arranged between an outer winding of the spring end and the cylindrical inner wall of the tensioning lever such that the end of the additional brake shoe close to the leg on the peripheral side contacts the spring leg of the helical spring, an end of the additional brake shoe away from the leg on the peripheral side contacts the stop surface of the housing-side catch, and the outer, cylindrical friction surface of the brake shoe contacts the cylindrical inner wall of the tensioning lever.

5. Tensioning device according to claim 3, wherein the helical spring has, on the housing side spring end, a stub end and the brake shoe is constructed as a circular ring segment and arranged facing away from the outer winding of the spring end on the peripheral side such that an end of the additional brake shoe close to the spring end on the peripheral side contacts the stub end of the helical spring, an end of the additional brake shoe away from the spring end on the peripheral side contacts the stop surface of the housing-fixed catch, and the outer, cylindrical friction surface of the brake shoe contacts the cylindrical inner wall of the tensioning lever.

6. Tensioning device according to claim 3, wherein a peripheral-side length of the brake shoe and a peripheral-side position of the housing-fixed catch with the associated stop surface are constructed and arranged such that a radial center axis of the brake shoe is oriented parallel to a middle acting direction of the belt or chain force on the tensioning roller of the tensioning lever.

7. Tensioning device according to claim 6, wherein the two spring ends of the helical spring, the stop surfaces of the two catches, the cylindrical inner walls of the base housing, and the tensioning lever, as well as the two brake shoes have structurally identical constructions, respectively.

8. Tensioning device according to claim 7, wherein a peripheral-side length of the brake shoe lies in a range between 60° and 180°.

* * * * *